United States Patent [19]
Tanaka

[11] Patent Number: 5,831,968
[45] Date of Patent: Nov. 3, 1998

[54] DISC CARTRIDGE HAVING A TAPERED DISC STORING PORTION

[75] Inventor: Satoshi Tanaka, Yokohama, Japan

[73] Assignee: Kabushiki Kaisha Toshiba, Kawasaki, Japan

[21] Appl. No.: 730,297

[22] Filed: Oct. 11, 1996

[30] Foreign Application Priority Data

Oct. 13, 1995 [JP] Japan .................................. 7-265856

[51] Int. Cl.$^6$ .................................................. G11B 23/03
[52] U.S. Cl. ........................................... 369/291; 360/133
[58] Field of Search .................................. 369/291, 289, 369/292; 360/133; 206/308.1, 308.3, 312

[56] References Cited

U.S. PATENT DOCUMENTS

| | | | |
|---|---|---|---|
| 3,500,364 | 3/1970 | David et al. | 206/308.3 |
| 4,476,978 | 10/1984 | Saito | 206/444 |
| 4,510,591 | 4/1985 | Schatteman | 369/77.1 |
| 4,613,044 | 9/1986 | Saito et al. | 206/444 |
| 4,618,061 | 10/1986 | Rubenfeld | 206/444 |
| 4,737,876 | 4/1988 | Brock et al. | 360/133 |
| 4,805,061 | 2/1989 | Champagne et al. | 360/133 |
| 4,837,652 | 6/1989 | Kerby | 360/133 |
| 4,843,511 | 6/1989 | Downey | 360/133 |
| 4,863,031 | 9/1989 | Tanaka et al. | 206/444 |
| 5,041,923 | 8/1991 | Iwata et al. | 360/60 |
| 5,150,269 | 9/1992 | Iwaki et al. | 360/133 |
| 5,150,354 | 9/1992 | Iwata et al. | 369/291 |
| 5,293,293 | 3/1994 | Iwata et al. | 360/133 |
| 5,325,256 | 6/1994 | Miyazaki et al. | 360/132 |
| 5,417,324 | 5/1995 | Joyce et al. | 206/310 |
| 5,421,950 | 6/1995 | Parrish | 156/579 |
| 5,499,233 | 3/1996 | Childers et al. | 369/291 |
| 5,526,342 | 6/1996 | Akiyama et al. | 369/291 |
| 5,539,600 | 7/1996 | Lee et al. | 360/133 |

FOREIGN PATENT DOCUMENTS

| | | |
|---|---|---|
| 0 217 785 | 4/1987 | European Pat. Off. . |
| 0 332 214 | 9/1989 | European Pat. Off. . |
| 0 335 461 | 10/1989 | European Pat. Off. . |
| 0 358 442 | 3/1990 | European Pat. Off. . |
| 0 368 347 | 5/1990 | European Pat. Off. . |
| 0 421 775 | 4/1991 | European Pat. Off. . |
| 94 23431 | 10/1994 | WIPO . |

*Primary Examiner*—Stuart S. Levy
*Assistant Examiner*—Kevin M. Watkins
*Attorney, Agent, or Firm*—Cushman Darby & Cushman IP Group of Pillsbury Madison & Sutro LLP

[57] ABSTRACT

A cartridge body has a disc storing portion for rotatably storing an optical disc, and a disc inlet/outlet port. A lid member for opening/closing the port is mounted on the cartridge body. The port includes a mid portion through which a center portion of the disc passes and a pair of end portions positioned on both sides of the mid portion through which peripheral portions of the disc pass. The width of the port gradually decreases from the mid portion to both end portions. The disc storing portion includes a center region facing the center portion of the disc, a first region extending from the center region to the port, and a second region extending from the center region in a direction opposite to the port. The first region has a cross-sectional shape equal to that of the port, and the second region is formed such that its width decreases in the radial direction from the center portion of the disc toward outer peripheral portions of the disc.

9 Claims, 11 Drawing Sheets

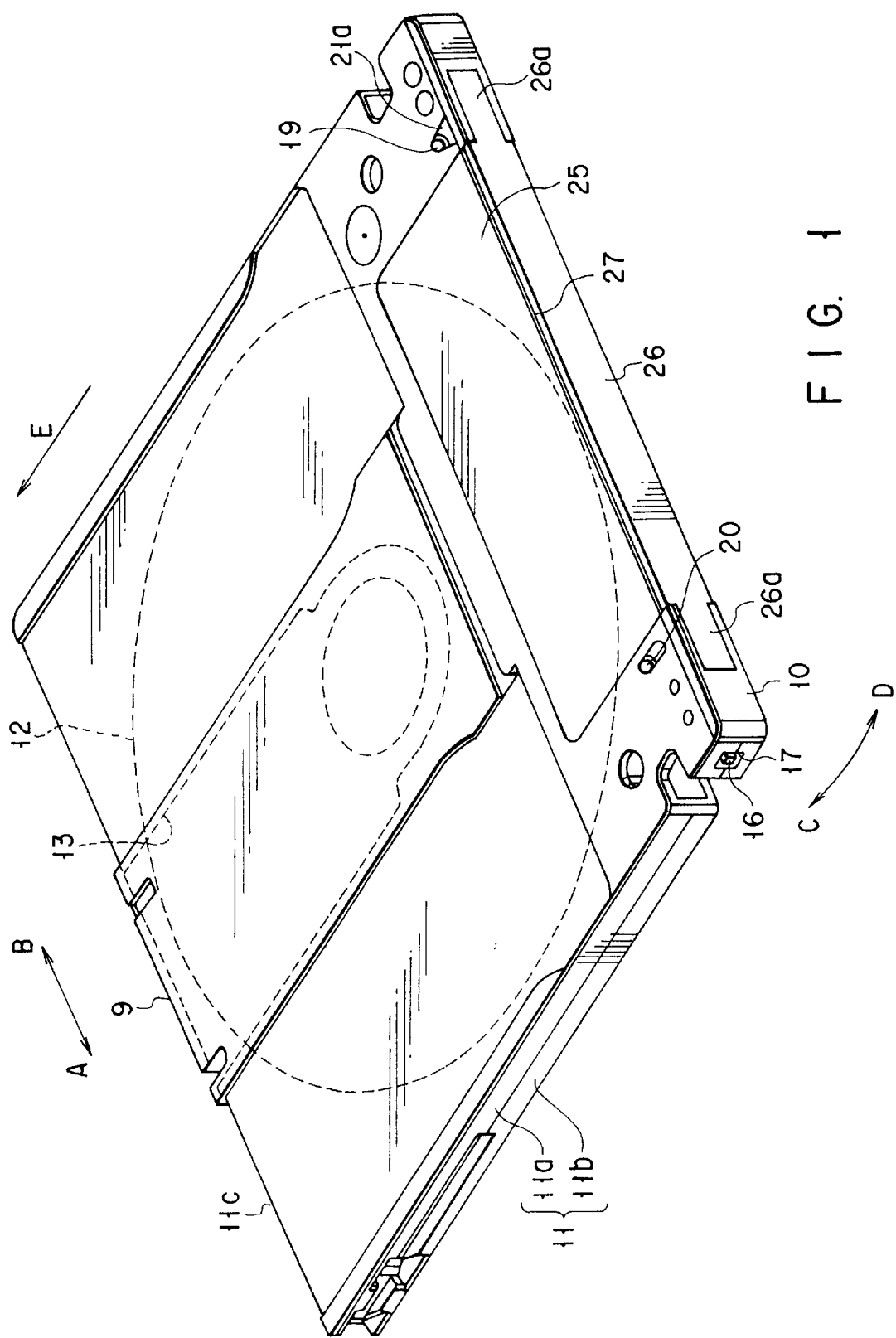
F I G. 1

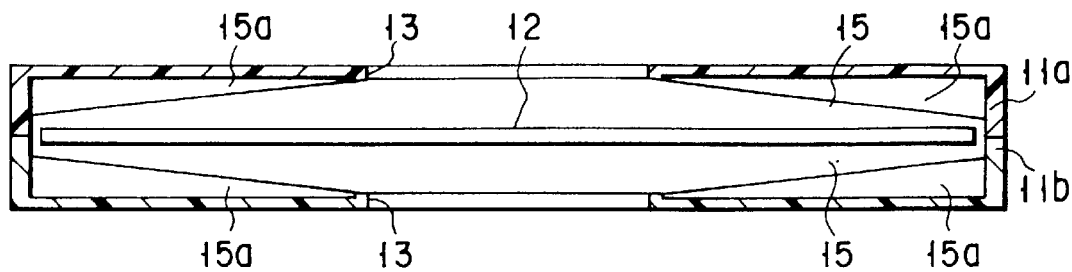
F I G. 4
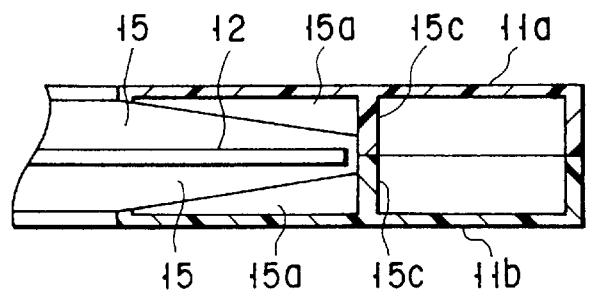
F I G. 5
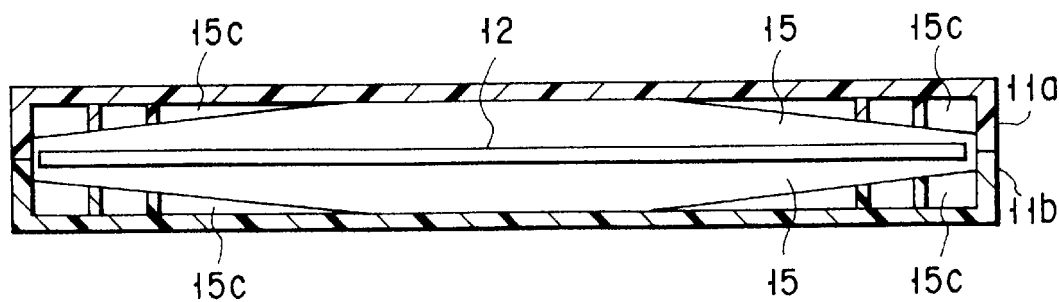
F I G. 6

DISC CARTRIDGE HAVING A TAPERED DISC STORING PORTION

BACKGROUND OF THE INVENTION

1. Field of the Invention

The present invention relates to a disc cartridge which contains a disc-like recording medium such as an optical disc, magneto-optical disc, a magnetic disc or the like and which has an opening section for making access with the recording medium to record and/or reproduce an information signal.

2. Description of the Related Art

Conventionally, this kind of disc cartridge comprises a flat rectangular cartridge body consisting of an upper case and a lower case coupled with each other, and a disc such as an optical disc, magneto-optical disc, or an magnetic disc, rotatably contained in the cartridge body. Each of the upper and lower cases has an opening portion for exposing that region of the disc which extends from the center portion of the disc to the outer peripheral portion thereof. A pick-up and a turn-table for rotating the disc of a recording reproduction device are accessible with the disc through the opening portions. In addition, the cartridge body is equipped with a slidable shutter for closing and opening the opening sections, which is made of a thin metal plate or hard synthetic resin.

On each of the outer surfaces of the cases is formed a concave label adhering portion such that the concave portion is recessed from the other portions of the surface, and an indication label for indicating the contents of the disc is adhered on to each of the label adhering portions.

When a disc cartridge having the above-mentioned structure is loaded into a disc recording reproduction device, the shutter is slid at first to an end side of the cartridge body by a shutter open/close means, thereby opening the opening portions. Subsequently, a turn-table is inserted into the cartridge body through one of the opening portions to support the disc, and a pick-up faces the surface of the disc through the opening portion. In this state, the disc is rotated by the turn-table, and recording and/or reproduction is performed on the disc by the pick-up.

In this kind of disc cartridge, the disc is contained in the cartridge body and the opening portions are closed by the shutter when the disc cartridge is not used, thus realizing safe disc storing. In addition, since the shutter is slid so that the disc in the cartridge body is exposed through the opening portions, to enable recording and reproduction, permanent use of the disc is realized.

In the disc cartridge having the structure as described above, however, disc protection is applied to realize long life-time of the disc, while the disc cannot be taken out of the cartridge body so that it is difficult to directly load the disc itself to the disc recording/reproducing device, for example. This kind of disc cartridge thus receives severe limitations in view of degree of freedom in disc use.

Particularly, in recent years, there has been requests for a disc cartridge applicable to both of a disc recording/reproducing device which is used with one disc singly loaded thereto, and a disc recording/reproducing device which is used with the entire disc cartridge loaded thereto.

In this kind of disc cartridge, there is a case that a disc kept contained in a cartridge body is loaded into a disc recording/reproducing device or a case that the disc is taken out of the cartridge body and is directly loaded into the disc recording/reproducing device. Therefore, the disc itself may be damaged, and countermeasures against such damages must be a significant problem.

SUMMARY OF THE INVENTION

The present invention has been made in view of the above situation, and has its object to provide a disc cartridge which realizes safe handling of a disc-like recording medium to improve the degree of freedom in use of a recording medium, while ensuring the function of the disc cartridge.

In order to achieve the above object, the disc cartridge according to the present invention comprises: a cartridge body including a disc storing portion for rotatably storing a disc-like recording medium, an opening portion for exposing a part of a surface of the recording medium, and a disc inlet/outlet port for taking in and out the recording medium; a shutter slidably arranged on the cartridge body, for opening/closing the opening portion; and a lid member mounted on the cartridge body to be rotatable between a closed position wherein the lid member closes the disc inlet/outlet port and an opened position wherein the lid member opens the disc inlet/outlet port.

The disc inlet/outlet port includes a mid portion through where a center portion of the recording medium passes and a pair of end portions positioned in both sides of the mid portion through peripheral portions of the recording medium pass, and is formed such that the width of the disc inlet/outlet port gradually decreases from the mid portion to both end portions.

The disc storing portion includes a first region extending from the center portion of the contained recording medium to the disc inlet/outlet port, and a second region extending from the center portion of the recording medium in a direction opposite to the disc inlet/outlet port. The first region has a cross-sectional shape equal to that of the disc inlet/outlet port, and the second region is formed such that a clearance with respect to at least one of the surfaces of the recording medium gradually decreases to be narrower in the radial direction from the center portion of the recording medium toward the outer peripheral portions of the recording medium.

According to the above structure, only the outer peripheral portion of the recording medium is brought into contact with the disc storing portion thereby preventing the recording surface from being damaged, when the recording medium operates unstably, for example. In addition, when the recording medium is extracted out of the disc inlet/outlet port, the disc is guided only at its outer peripheral portion by the disc storing portion and the disc inlet/outlet port. Therefore, when singly using the recording medium, the recording medium can be taken in or out with respect to the cartridge body, without damaging the recording medium. The recording medium can thus be securely protected. Simultaneously, the degree of freedom in use of a recording medium can be improved.

Also, according to the present invention, the disc storing portion is defined by a plurality of ribs provided at a predetermined interval on the inner surface of the cartridge body. Therefore, the disc protection structure can be effectively realized without increasing the weight of the cartridge.

Further, according to the present invention, the lid member is formed in a color different from that of the cartridge body. As a result, when the cartridge body is used with a recording medium contained therein, the direction in which the cartridge body is loaded can be easily confirmed so that wrong insertion of the cartridge into a disc recording/reproducing device can be effectively prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing a disc cartridge according to an embodiment of the present invention;

FIG. 4 is a cross-section cut along the line IV—IV of FIG. 2;

FIG. 5 is a cross-section cut along the line V—V of FIG. 2;

FIG. 6 is a cross-section cut along the line VI—VI of FIG. 2;

DETAILED DESCRIPTION OF THE PREFERRED EMBODIMENTS

An embodiment of the present invention will now be described in detail with reference to the accompanying drawings.

Figure 2:
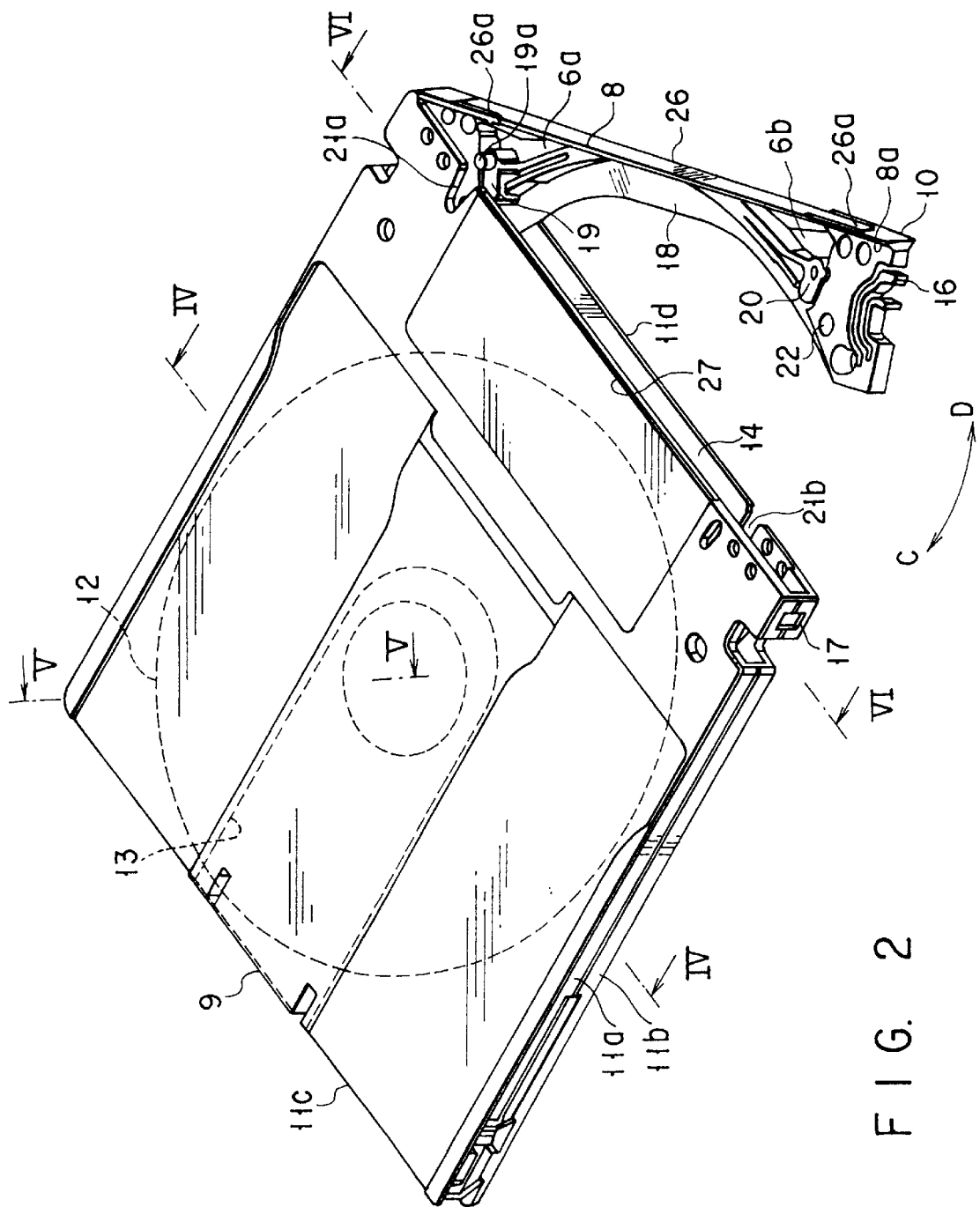
FIG. 2 is a perspective view of the above-mentioned disc cartridge where its lid member is opened.

As shown in FIGS. 1 and 2, a disc cartridge according to the present embodiment, comprises a flat rectangular box-like cartridge body 11 and an optical disc 12 contained rotatably in the cartridge body. The cartridge body includes a pair of main walls (or main surfaces) which face each other and are in parallel with each other, and four side walls (or side end surfaces) which are positioned continuously along the side ends of the main walls.

The cartridge body 11 includes an upper casing 11a and a lower casing 11b which are formed to be substantially symmetrical to each other and made of synthetic resin such as ABS or the like. These casings are arranged so as to face each other, constituting the cartridge body. Further, a disc storing portion 15 which will be described later is defined within the cartridge body 11, and the optical disc is stored in the disc storing portion 15 with a predetermined clearance maintained between the disc surfaces and the inner surfaces of the cartridge body 11. The upper and lower casings 11a and 11b respectively face the surfaces A and B of the optical disc 12.

In addition, an opening 13 is formed in each of the upper and lower casings 11a and 11b. The openings 13 have a predetermined width, extend to the vicinity of the front surface 11c of the cartridge body 11 from the center portions of the casings, and face each other. These openings 13 respectively face the surfaces A and B of the optical disc 12 contained in the cartridge body 11, exposing the optical disc to the outside over the region from the rotational center of the disc to the outer periphery thereof.

The cartridge body 11 is provided with a shutter 9 of a double-side integral type which opens/closes both of the openings 13. The shutter 9 has a substantially U-shaped cross-section and is fitted onto the cartridge body 11 from the front surface 11c side so as to sandwich both surfaces of the cartridge body. As shown in FIGS. 1 and 2, the shutter 9 is slidable between a closed position wherein the shutter closes the openings 13 and two open positions defined in both sides of the closed position wherein the shutter opens the openings 13, in a direction (or direction A-B) parallel to the front end surface 11c of the cartridge body 11. Further, the shutter 9 is continuously urged toward the closed position by shutter springs not shown.

A disc inlet/outlet port 14 for inserting/extracting the optical disc 12 into/from the cartridge body 11 is formed in the rear end surface lid of the cartridge body 11, and the port 14 extending over the entire length of the rear end surface 11. In addition, a lid member 10 for opening/closing the inlet/outlet port 14 is rotatably mounted on the cartridge body 11.

Here, supposing that the insert direction in which the disc cartridge is loaded into a disc record/reproduce device not shown is E, the end surface of the disc cartridge body 11 positioned in the forward side in the insert direction is defined as the front end surface 11c, while the end surface of the disc cartridge body positioned in the backward side in the insert direction is defined as the rear end surface 11d.

Figure 3:
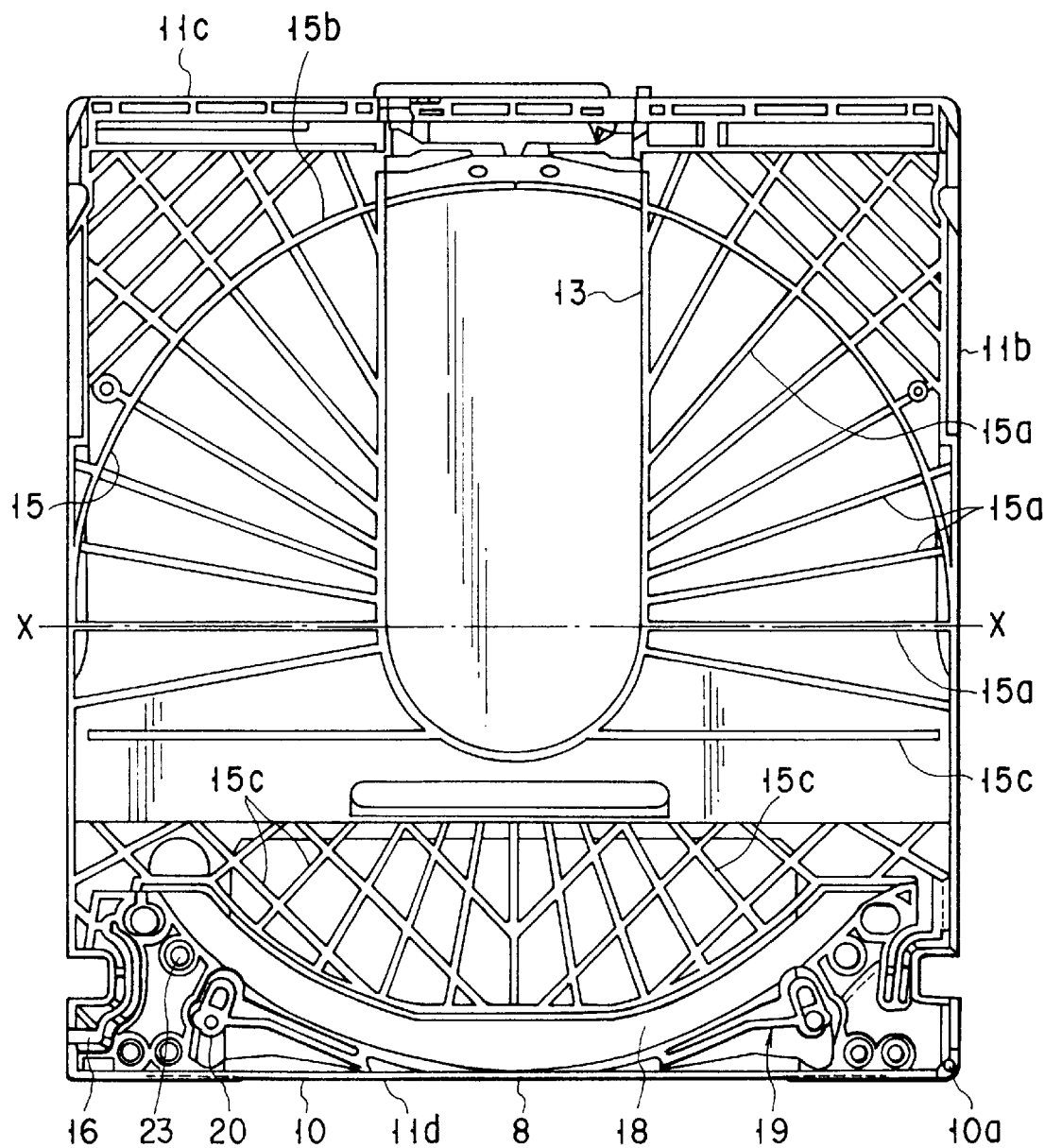
FIG. 3 is a plan view showing the lower case and the lid member of the disc cartridge.

As shown in FIGS. 3 to 5, on the inner surface of the lower casing 11b, a number of ribs 15a extending in the radial direction from the center of the lower casing corresponding to the center of the stored optical disc 12 and a rib 15b having an half-circle shape around the center of the lower casing as its center are provided in the region (or second region) between the center line X—X of the lower casing and the front end surface 11c. These ribs 15a are arranged at a predetermined intervals in the circumferential direction around the center of the lower casing 11b. Each of the ribs 15a is shaped such that the height is increased gradually in the radial direction from the center of the lower casing 11b. The semi-circular rib 15b has a diameter slightly larger than that of the optical disc 12.

Meanwhile, as shown in FIGS. 3 and 6, on the inner surface of the lower casing 11b, a number of ribs 15c are formed within a region (or first region) between the center line X—X of the lower casing and the rear end surface 11d. These ribs 15c are formed such that the ribs are low in area of the center portion of the lower casing 11b and are high in the area of both end portions thereof, viewed in the widthwise direction of the lower casing 11b, i,e, in a direction parallel to the center line X—X.

Note that the upper casing 11a comprises ribs 15a, 15b, and 15c similar to those described above, and is formed in the same manner as the lower casing 11b. Therefore, the disc storing portion 15 of the cartridge body 11 which is formed by coupling the upper and lower casings is shaped such that this portion 15 is broad in the area of the center portion of the optical disc 12 and becomes narrower toward the outer circumference of the disc 12, as far as the front end half region (or the second region) of the cartridge body 11. With respect to the rear end half region (or the first region) of the cartridge body 11, the disc storing portion 15 has the smallest thickness dimension at the both side end portions of the cartridge body and has the largest thickness dimension at the center portion between the both side end portions of the cartridge body. As a result of this, the optical disc 12 is contained in the disc storing portion 15, with only the outer peripheral portion supported, and only the outer peripheral portion has a contact with the inner surface of the cartridge body 11 when the optical disc 12 passes through the disc inlet/outlet port 14.

Although the upper and lower casings 11a and 11b of the cartridge body 11 define the disc storing portion 15 and the disc inlet/outlet port 14 by means of a plurality of ribs 15a, 15b, and 15c, the same shapes as the storing portion 15 and the port 14 may be defined by the inner surfaces themselves of the casings without using ribs.

Figure 7:
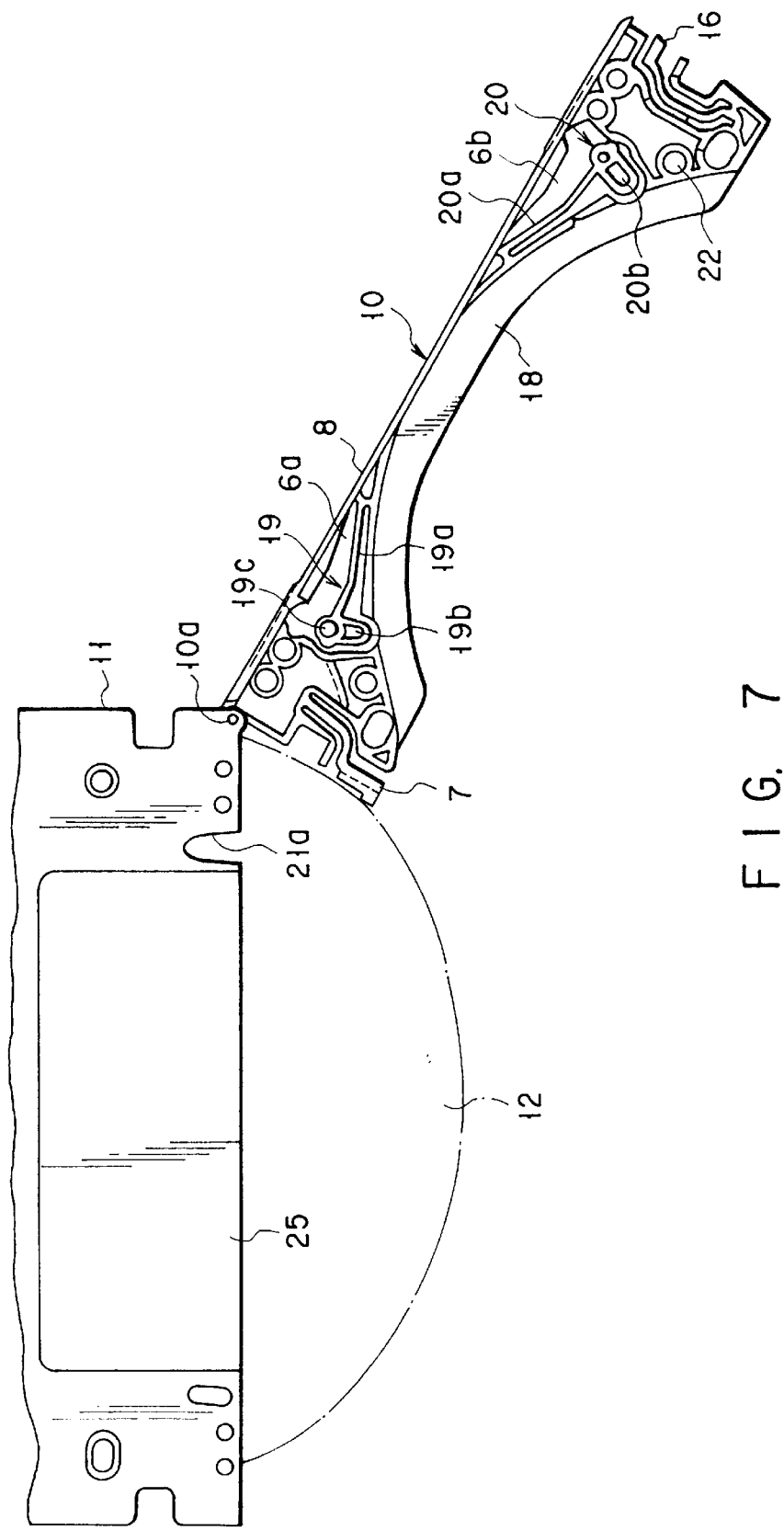
FIG. 7 is a plan view showing the lid member released.

As shown in FIGS. 2, 3, and 7, the lid member 10 is shaped like a flat elongate plate which has a length substantially equal to the width of the cartridge body 11 and has a thickness which allows the lid member to be fitted into the disc storing portion 15. A fringe 8 is formed at one side edge of the lid member 10 and extends over the entire width of the cartridge body. This fringe 8 projects upwards and downwards from the lid member 10 in the thickness direction of the cartridge body 11. The lid member 10 is integrally formed of synthetic resin, and is especially formed of synthetic resin of a color different from that of the cartridge body 11.

One end of the lid member 10 is pivoted on a rear right corner portion of the cartridge body 11 by a pivot shaft 10a. Therefore, the lid member 10 can be rotated in the arrow direction C-D around the pivot shaft 10a, thereby opening/closing the disc inlet/outlet port 14. When the lid member 10 is rotated to a closed position, the lid member 10 enters into the disc storing portion 15 through the disc inlet/outlet port 14, and the fringe 8 abuts against the rear end edges of the cartridge body 11, thereby closing the disc inlet/outlet port 14.

A free end portion of the lid member 10, i.e., the end portion of the lid member 10 which is opposite to the pivot shaft 10a is provided with a lock claw 16 which is elastically deformable, while an engage hole 17 which can be engaged with the lock claw 16 is formed in the rear end portion of the left side wall of the cartridge body 11. Therefore, when the lid member 10 is rotated to the position where the lid member 10 closes the disc inlet/outlet port 14, the lock claw 16 is engaged with the engage hole 17, thereby locking the lid member 10 to the close position. Note that this locking can be released and the lid member 10 can be opened, by pushing inwards the lock claw 16 through the engage hole 17 from the outside of the cartridge body 11.

Figure 8:
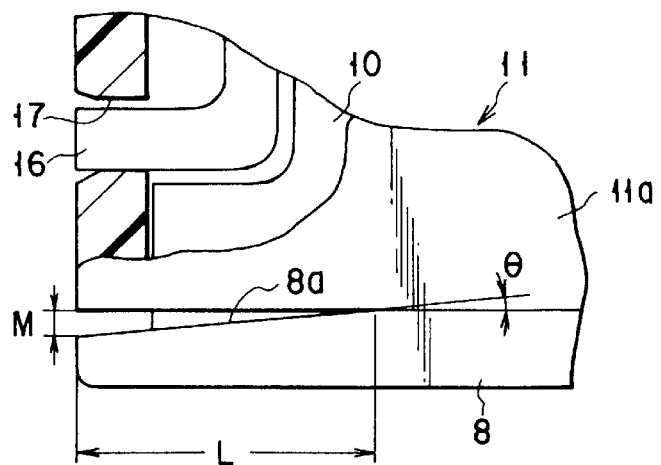
FIG. 8 is an enlarged plan view showing a free end side of the lid member.

As shown in FIG. 8, at the free end portion of the lid member 10, slanting surfaces 8a are formed on the fringe 8 such that a clearance M is formed between the fringe 8 and the rear end edges of the upper and lower casings 11a and 11b, where the lid member 10 is closed. Each of the slanting surfaces 8a extends outwards in the direction of an angle 10° from the point positioned apart from the free end of the fringe 8 by a length L. Thus, a clearance M of about 0.3 mm is obtained at the free end of the lid member 10.

In the above structure, the lock claw 16 of the lid member 10 and the engage hole 17 of the cartridge body 11 can be engaged with each other with a minimum margin, and thereby preventing backlash of the lid member 10 in the close position. Specifically, the lock claw 16 is positioned and formed in a manner such that the free end portion of the lid member 10 is further pushed toward the rear end surface lid side by the clearance M and is thus elastically deformed so that the lock claw 16 is engaged with the engage hole 17, after the lid member 10 is rotated to the close position to bring the other portion of the fringe 8 than the slanting surface 8a, into contact with the rear end surface 11d of the cartridge body. Therefore, when the pushing force applied to the free end portion of the lid member 10 is released after the lock claw 16 is engaged with the engage hole 17, the free end portion of the lid member 10 generates an elastic force in the direction in which this free end portion is apart from the rear end surface 11d of the cartridge body 11, and the lock claw 16 is kept engaged with the engage hole 17 by this elastic force. Therefore, the lid member 10 securely closes the disc inlet/outlet port 14 of the cartridge body 11 without backlashing.

Figure 9:
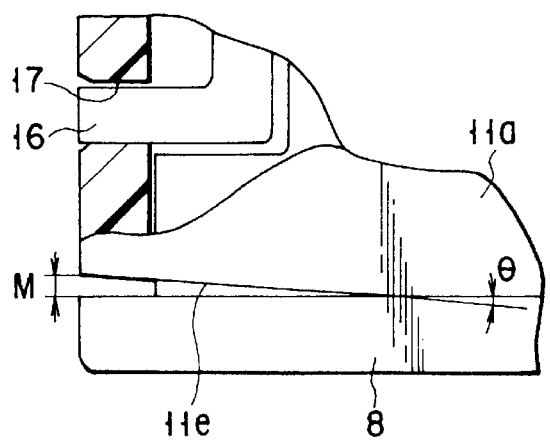
FIG. 9 is a plan view showing a modification of the lid member and the cartridge body.

The same function as described above can be obtained if slanting surfaces 11e are formed on the rear end surface 11d of the cartridge body 11, as shown in FIG. 9, in place of forming slanting surfaces 8a on the fringe 8 of the lid member 10.

As shown in FIGS. 2, 3, and 7, the lid member 10 is provided with an arc-like disc guide recess 18 in correspondence with the disc storing portion 15 of the cartridge body 11. Where the lid member 10 is closed, a part of the optical disc 12 is positioned in the disc guide recess 18. When the optical disc 12 stored in the disc storing portion 15 is take out of the cartridge body 11 through the disc inlet/outlet port 14 while the lid member 10 is rotated in the arrow direction D and is thereby opened, the outer peripheral portion of the optical disc 12 is partially stored in the disc guide recess 18 and is thus prevented from suddenly or directly falling from the cartridge.

In addition, a stopper 7 having a claw-like shape which can be elastically deformed is provided at the end portion of the lid member 10 in the side close to the pivot shaft 10a. This stopper 7 elastically hangs on the outer peripheral portion of the optical disc 12 and prevents the optical disc from suddenly falling, when the lid member 10 is sufficiently opened and the optical disc 12 is extracted out of the cartridge body 11.

As shown in FIGS. 2, 3, 7, and 10, first and second write protect operating portions 19 and 20 which are elastically deformable are integrally formed on the lid member 10, so as to correspond to the surfaces A and B of the optical disc 12. For example, the first write protect operating portion 19 includes an arm portion 19a projecting from the substantial center portion of the lid member 10 in the widthwise direction thereof toward the end portion of the lid member close to the pivot shaft 10a side, a sector portion 19b provided at the extended end of the arm portion 19a, and a switch operating element 19c projecting from the sector portion 19b toward the upper casing 11a side. Further, the first write protect operating portion 19 is positioned in an opening 6a formed in the lid member 10, and only the proximal end of the arm portion 19a is connected to the lid member. As a result of this, the write protect operating portion 19 is thus rotatable in the opening 6a around the proximal end of the arm portion 19a as the rotational center.

The second write protect operating portion 20 is formed to be symmetrical to the first write protect operating portion 19 with respect to the center of the lid member 10 in the widthwise direction thereof. Specifically, the second write protect operating portion 20 includes an arm portion 20a, a sector portion 20b provided at the extended end of the arm portion, and a switch operating element 20c (see FIG. 11C) projecting from the sector portion toward the lower casing 11b side. Further, the second write protect operating portion 20 is positioned in an opening 6b formed in the lid member 10, and only the proximal end of the arm portion 20a is connected to the lid member.

Meanwhile, in the vicinity of the pivot shaft 10a of the lid member 10, a storing hole 21a is formed in the rear end portion of the upper casing 11a and open to the rear end surface 11d. In the vicinity of the engage hole 17, another storing hole 21b is formed in the rear end portion of the lower casing 11b and open to the rear end surface 11d. Further, where the lid member 10 is closed, the switch operating element 19c of the first write protect operating portion 19 and the switch operating element 20c of the second write protect operating portion 20 are respectively stored in the storing holes 21a and 21b, and the first and second write protect operating portions 19 and 20 can be actuated through the storing holes.

Upon assembling the disc cartridge, when the lid member 10 is attached to the cartridge body 11 at the disc inlet/outlet port 14, the lid member 10 is firstly mounted at a predetermined position on the lower casing 11b. In this case, the pivot shaft 10a integrally formed with the lid member 10 is inserted into a hole (not shown) of the lower casing 11b, and the lid member is maintained at its closed position. In the next, the upper casing 11a is covered over the lid member 10 and the lower casing 11b from the upside, such that the pivot shaft 10a of the lid member 10 is inserted into a hole not shown of the upper casing. In this manner, the lid member 10 is assembled between the upper and lower casings 11a and 11b, kept at the closed position.

Figure 11A:
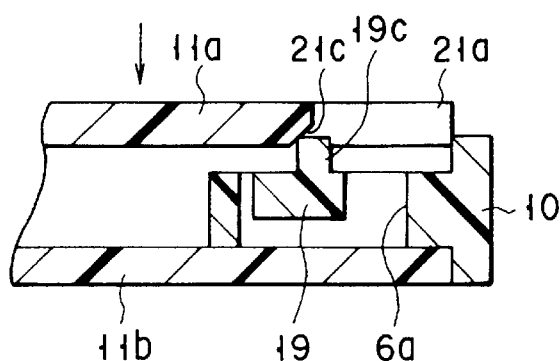
FIGS. 11A and 11B are cross-sections schematically showing a step of positioning a first write-protect operating portion.
Figure 12A:
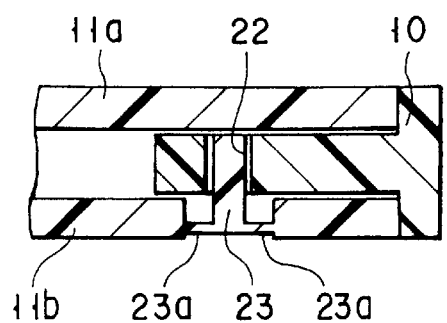
FIG. 12A is a cross-section showing an opening detect portion of the disc cartridge.
Figure 11B:
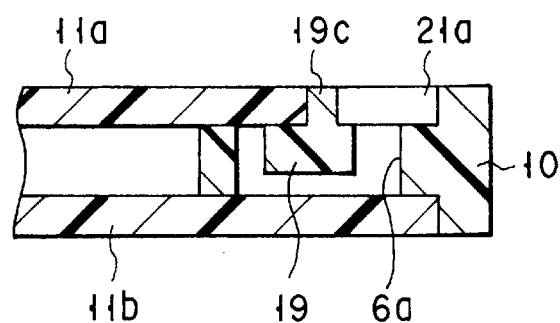
Figure 12B:
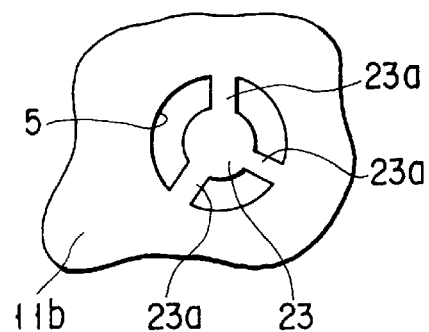
FIG. 12B is a plan view showing a detect pin portion of the opening detect portion.
Figure 11C:
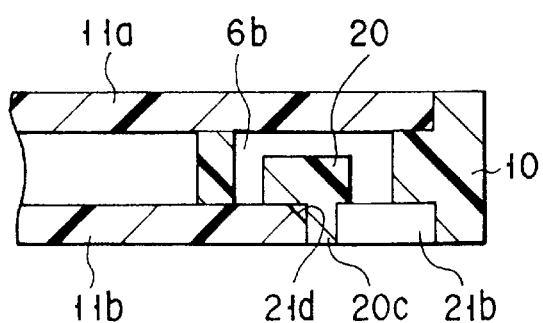
FIG. 11C is a cross-section schematically showing a step of positioning a second write-protect operating portion.

Here, as shown in FIGS. 11A and 11B, the storing hole 21a formed in the upper casing 11a has a slanting surface 21c which is positioned in the bottom side of the storing hole 21a and in the inner surface side of the upper casing 11a and which functions as guide means. When the upper casing 11a is covered over the lower casing 11b, the switch operating element 19a of the first write protect operating portion 19 of the lid member 10 is guided to the rear end surface side of the upper casing 11a along the slanting surface 21c of the storing hole 21a. At the time point where connection between both casings is completed (or in the state where assembling of both casings is completed), the switch operating element 19a is contained in the storing hole 21a, kept in contact with the bottom end of the storing hole 21a, and the first write protect operating portion 19 is positioned at a predetermined initial operating position.

Figure 10:
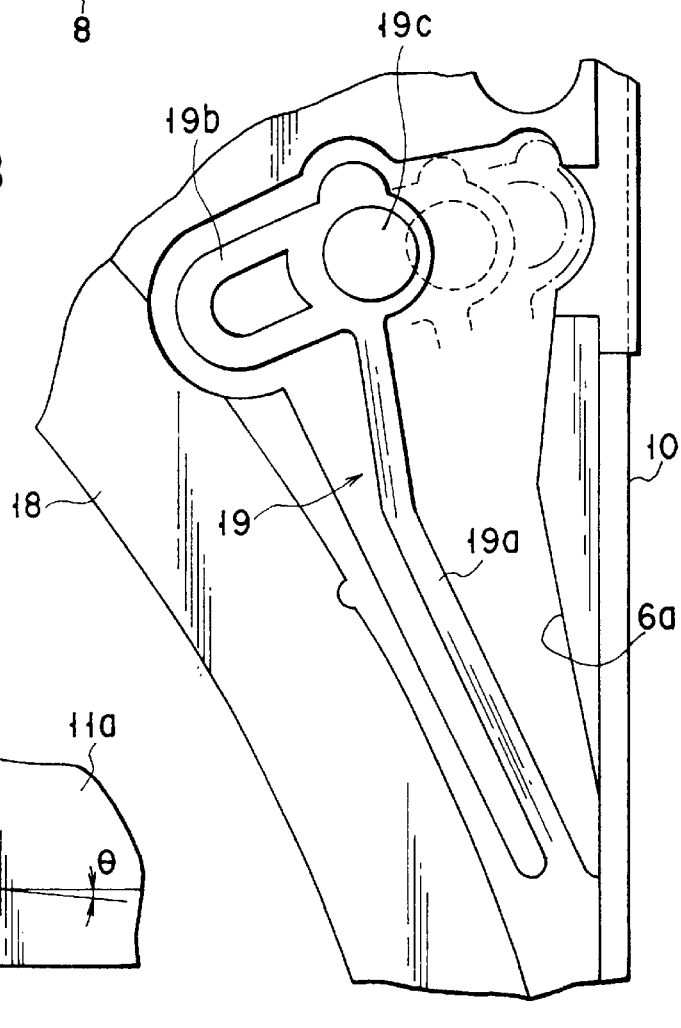
FIG. 10 is an enlarged plan view showing the write-protect portion of the lid member.

Specifically, the first write protect operating portion 19 is in a molding position indicated by a solid line in FIG. 10, in a state before the lid member 10 is assembled into the cartridge body 11. Further, the first write protect operating portion 19 is automatically positioned at the initial operating position indicated by a broken line in FIG. 10 in a state in which the lid member 10 is assembled in the cartridge body 11. Then, this first write protect operating portion 19 can be switched between the initial operating position (e.g., a write protect position) and a switched position (or a write allowable position) indicated by a dots and dashed line shown in FIG. 10. Note that the initial operating position may otherwise be set to a write allowable position while the switched position may be set to the write protect position.

Likewise, the second write protect operating portion 20 is positioned at an initial operating position at the time point, such that the switch operating element 20c is guided along the slanting surface 21d of the storing hole 21b formed in the lower casing 11b and is brought into contact with the bottom end of the storing hole 21b, and that the operating portion 20 can be operated, when connection between the upper casing 11a and the lower casing 11b is completed.

As shown in FIGS. 1 to 3, 7, 12A, and 12B, the disc cartridge comprises opening detect means for detecting whether the lid member is opened or closed. Specifically, a through-hole 22 for detecting whether the lid member is opened or closed is formed in the vicinity of the free end of the lid member 10, and extends in the direction perpendicular to the moving direction of the lid member. In a state that the lid member 10 is in the closed position, a detection pin 23 standing on the inner surface of the lower casing 11b is inserted in the through-hole 22.

The proximal end portion of the detect pin 23 is positioned in a circular opening 5 formed in the lower casing 11b and is formed integrally with the lower casing 11b while being connected to the lower casing 11b through thin bridges 23a, so that the pin 23 can be easily bent and taken off from the lower casing 11b. The opening 5 is aligned with the through-hole 22 of the lid member 10 in the closed position. Further the detect pin 23 is inserted into the through-hole 22 when attaching the lid member 10 so as to corresponding to the disc inlet/outlet port 14 of the lower casing 11b while assembling the disc cartridge.

Before the lid member 10 is opened for the first time after assembling the disc cartridge, the detect pin 23 is kept inserted in the through-hole 22 of the lid member 10. Therefore, the through-hole 22 is closed by the detect pin 23, and cannot be used to detect whether or not the lid member 10 has once been opened.

If the lid member 10 is rotated and opened in the arrow direction D around the pivot shaft 10a as the rotation center to extract the optical disc 12 from the cartridge body 11, the detect pin 23 is pushed by the lid member 10 and is bent at the bridges 23a and taken off from the lower casing 11b, so that this pin 23 is removed out together with the lid member to the outside of the cartridge body. In addition, the circular opening 5 is formed as a mark of the detect pin 23 after this pin is taken off. Therefore, when the lid member 10 is closed again, the circular opening 5 of the lower casing 11b and the through-hole 22 of the lid member 10 are aligned with each other. Consequently, the through-hole 22 of the lid member 10 can be detected through the opening 5.

If the lid member 10 is thus opened from the disc inlet/outlet port 14 to a state in which the disc can be extracted, the detect pin 23 of the lower casing 11b is removed, and as a result, it is possible to detect the experience that the lid member 10 has once been opened, i.e., that the optical disc 12 has once been extracted from the cartridge body 11.

Note that the detect pin 23 may be provided on the upper casing 11a.

Figure 13:
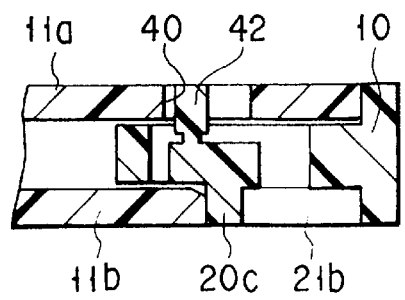
FIG. 13 is a cross-section showing a modification of the opening detect portion.

As shown in FIG. 13, the opening detect means may have another construction wherein a through-hole 40 for detecting whether the lid member 10 is opened or closed is formed in the upper casing 11a and a detect pin 42 which is engaged with the through-hole 40 and can be easily bent and removed may be provided on the lid member 10, e.g., on the write protect operating portion 20, so that the detect pin 42 is bent and removed when the lid member 10 is rotated and opened from the disc inlet/outlet port 14 of the cartridge body 11. In this manner, whether the through-hole 40 formed in the upper casing 11a is closed or opened is detected and whether or not the lid member 10 has once been opened is identified. In this case, the through-hole 40 used for detection may be formed in the lower casing 11b.

In this case, the through-hole 40 is formed to be elongated in the moving direction of the write protect operating portion 20 so that the write protect operating portion 20 can be switched and operated in the state where the lid member 10 is closed. In addition, the through-hole 40 and the detect pin 42 extend in a direction perpendicular to the moving direction of the lid member 10.

Figure 14A:
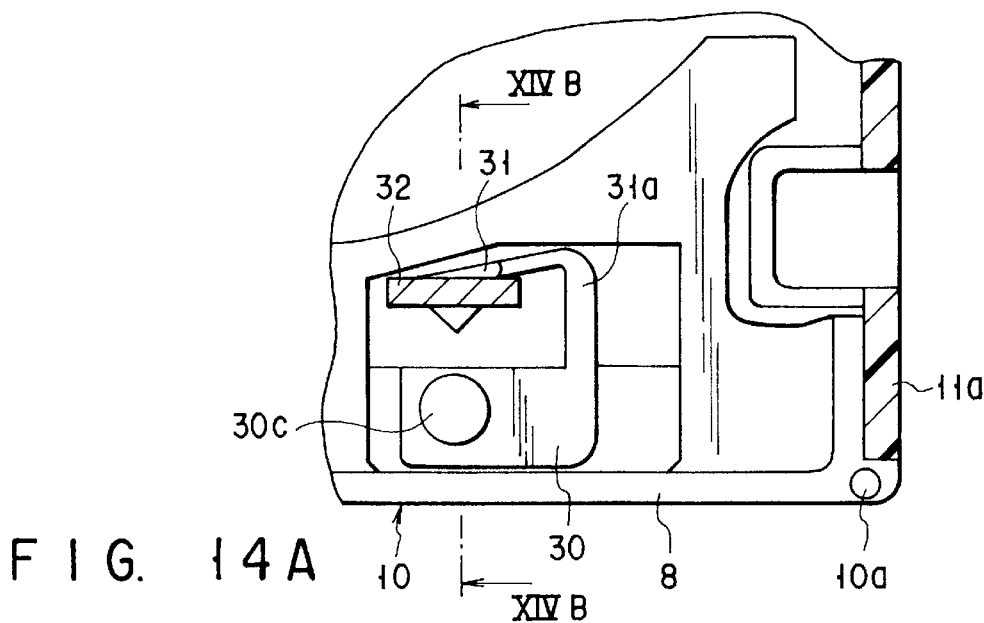
FIG. 14A is a plan view showing another modification of the opening detect portion.
Figure 14B:
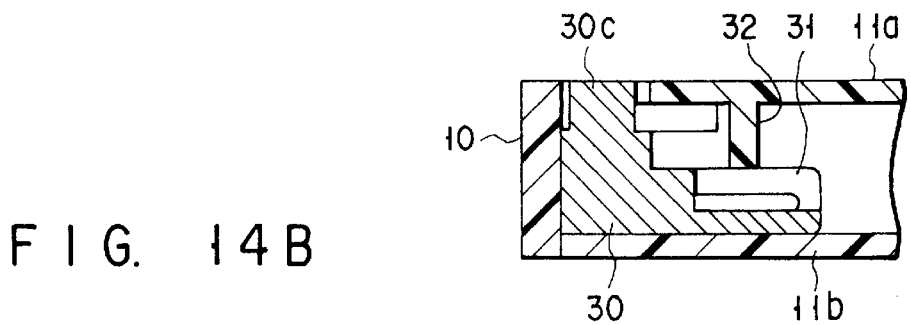
FIG. 14B is a cross-section showing the opening detect portion according to the another modification.
Figure 15:
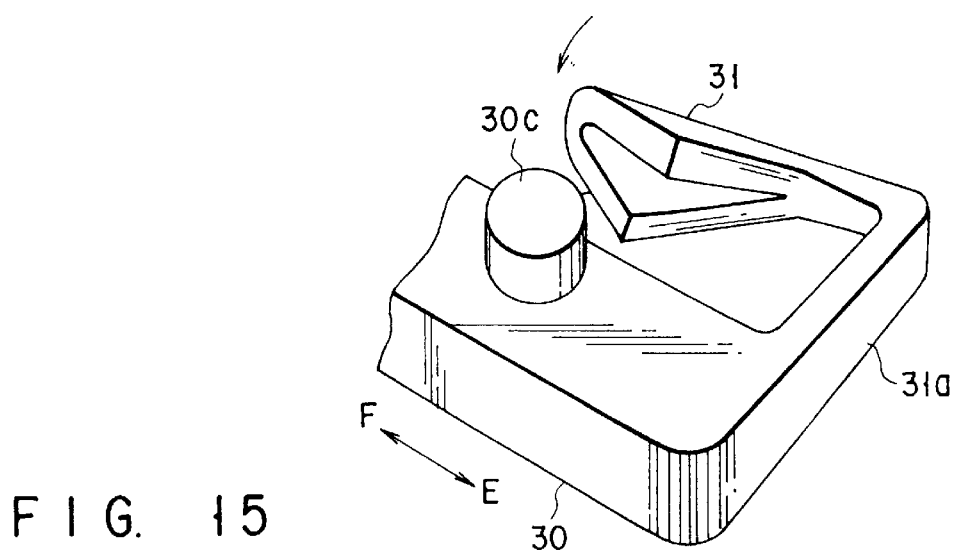
FIG. 15 is a perspective view showing the write-protect operating portion of the opening detect portion according to the another modification.

In addition, the opening detect means may be constructed as shown in FIGS. 14A, 14B, and 15. Specifically, the lid member 10 is provided with a write protect operating portion 30 which is movable in an arrow direction E-F. This write protect operating portion 30 is provided with a bent portion 31 through an elastic arm 31a, and the bent portion 31 is bent in a V-shaped form and can be elastically deformed through the elastic arm 31a. Besides, an operating element 30c is formed on the write protect operating portion 30. In addition, a position limit projection 32 which can abut against the bent portion 31 is projected on the inner surface of the upper casing 11a. Further, when the lid member 10 is provided between the upper and lower casings 11a and 11b, the bent portion 31 is brought into contact with the position limit projection 32 and is installed with being bent by the position limit projection 32 against the elasticity of the bent portion 31 itself.

In the structure as described above, when the lid member 10 is rotated in the arrow direction D with respect to the cartridge body 11, as has been described above, this lid member opens the disc inlet/outlet port 14 of the cartridge body 11, and simultaneously the bent portion 31 leaves the position limit projection 32.

When the lid member 10 once opened is rotated in the arrow direction C thereby closing the disc inlet/outlet port 14 of the cartridge body 11, the corner portion side of the write protect operating portion 30 is brought into contact with the position limit portion 32, and is rotated in the counterclockwise direction by the position limit projection 32, in accordance with rotation of the lid member. As a result of this, the write protect operating portion 30 is moved in the arrow direction E, and locked at the write protect position. Further, whether or not the lid member 10 is opened from the disc inlet/outlet portion 14 is identified on the basis of the position of the write protect operating portion 30.

Figure 16:
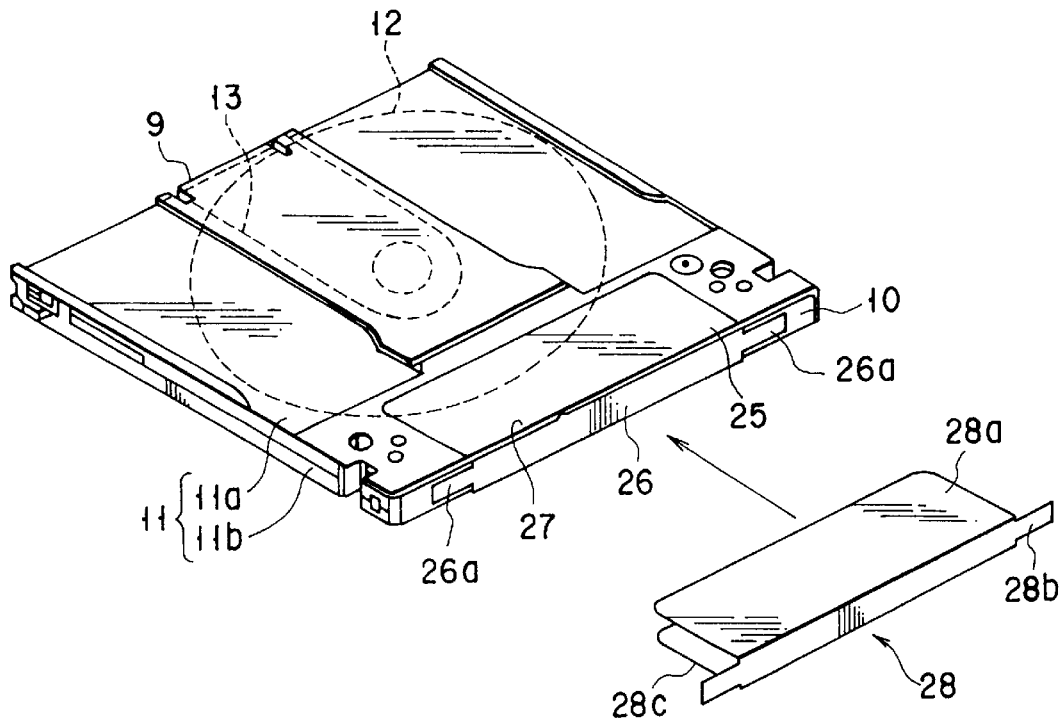
FIG. 16 is a perspective view showing the disc cartridge and an indication label applied thereto.
Figure 17:
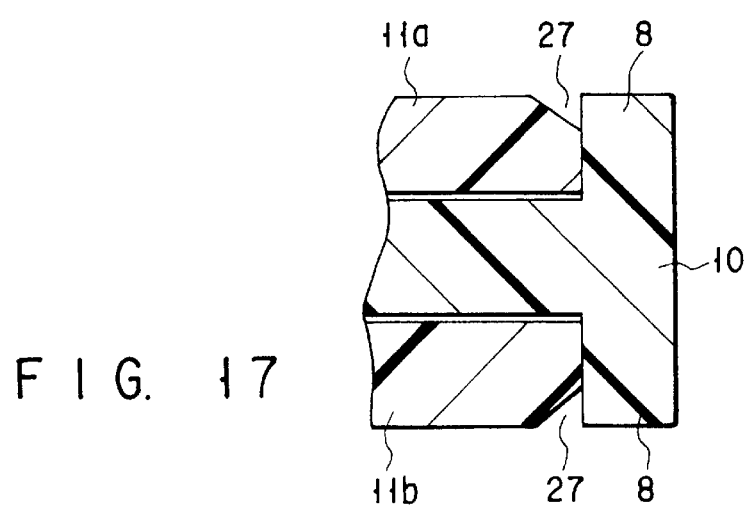
FIG. 17 is a cross-section showing a label separation groove of the cartridge body.

In the rear end portion of the cartridge body 11, as shown in FIGS. 1, 16, and 17, first label adhering portions 25 each having a rectangular concave shape and each recessed from the other portions are respectively formed in the main surfaces of the upper and lower casings 11a and 11b which are opposite to the optical disc. (For conveniences, FIG. 1 shows only one of the first label adhering portions 25 which is provided in the upper casing.) In addition, a second label adhering portion 26 having an elongated rectangular shape is formed on the outer surface of the lid member 10 and is continuous to the first label adhering portions 25.

Concave position limit portions 26a projecting to both sides of the cartridge body 11 are respectively provided for both ends of the second label adhering portion 26. Further, label separation grooves 27 are formed on the rear end edges of the upper and lower casings 11a and 11b and extend along the boundaries between the first label adhering portions 25 and the second label adhering portion 26.

An indication label 28 having first to third rectangular indication surfaces 28a, 28b, and 28c is adhered on the first and second label adhering portions 25 and 26 of the cartridge body 11, as shown in FIG. 16. Among these indication surfaces, the second indication surface 28b is shaped so as to have a longer length dimension than the first and third indication surfaces 28a and 28c, and is positioned with respect to the second label adhering portion 26 in such a manner that three edges of each side projecting portion of the indication surface 28b are matched with the corresponding position limit portion 26a of the second label adhering portion 26. At the same time, the first and third indication surfaces 28a and 28c of the indication label 28 are adhered onto the first label adhering portions 25 such that the end portions of these surfaces respectively correspond to the end portions of the first label adhering portions 25 of the upper and lower casings 11a and 11b.

The position limit portions 26a of the second label adhering portion 26 may be formed such that the position limit portions 26a define at least two end edges of the indication surface 28b of the indication label 28.

Further, the indication label 28 thus adhered on the first and second label adhering portions 25 and 26 can be easily divided into first to third indication surfaces 28a to 28c, by tracing the label separate grooves 27 of the cartridge body 11 with use of a tool such as a pen or the like. Therefore, the indication label 28 adhered on the first and second label adhering portions 25 and 26 can easily be replaced partially, in units of first to third indication surfaces 28a to 28c. As a result of this, when information in the optical disc 12 is over-written or so, the label can be easily replaced in such a manner in which replacement of a current indication label does not affects records on the current indication label.

Hence, the indication label 28 is adhered on a base sheet 33 with an adhesion applied on the back surface of the label, such that the label can be pealed off from the sheet, as shown in FIGS. 18A to 18D. In case of the indication label 28 shown in FIG. 18A, boundaries between first to third indication surfaces 28a to 28c are not processed. However, perforation-like cutting guide lines (FIG. 18B) may be formed at a predetermined distance maintained therebetween, or cutting guide lines (FIG. 18C) continuously extending in the widthwise direction to the middle area of the boundaries may be formed on the boundaries, so that first to third indication surfaces can be separated from each other upon requests after the indication label 28 is adhered on the cartridge body 11. In this manner, handling ability of the label can be improved when adhering labels.

Figure 18A:
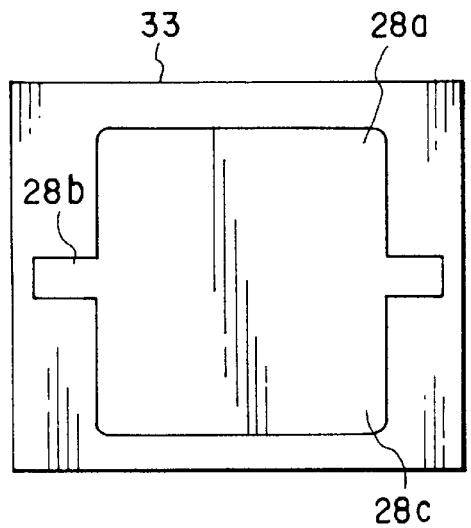
FIGS. 18A to 18D are plan views respectively showing different indication labels.
Figure 18B:
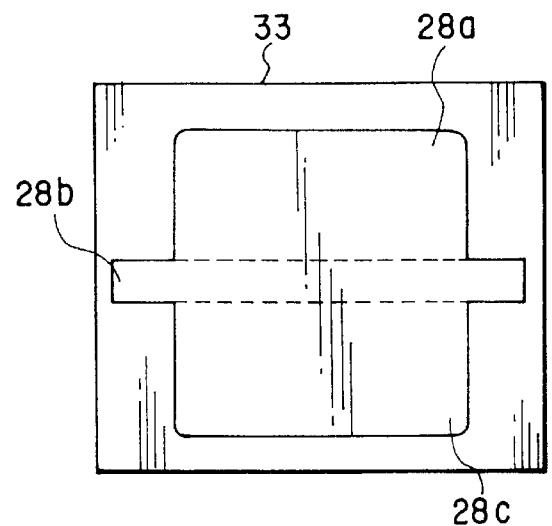
Figure 18C:
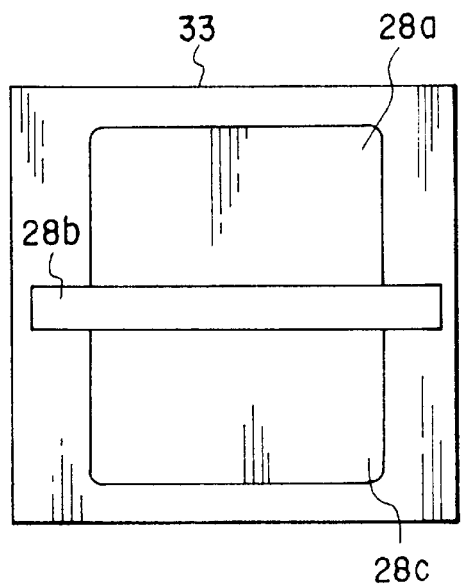
Figure 18D:
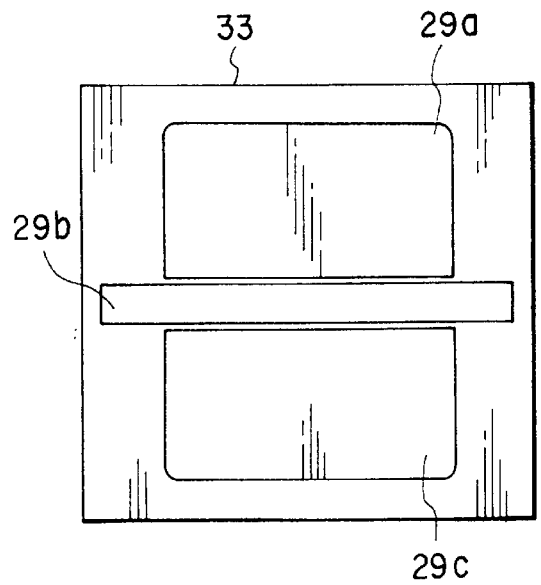
Figure 19:
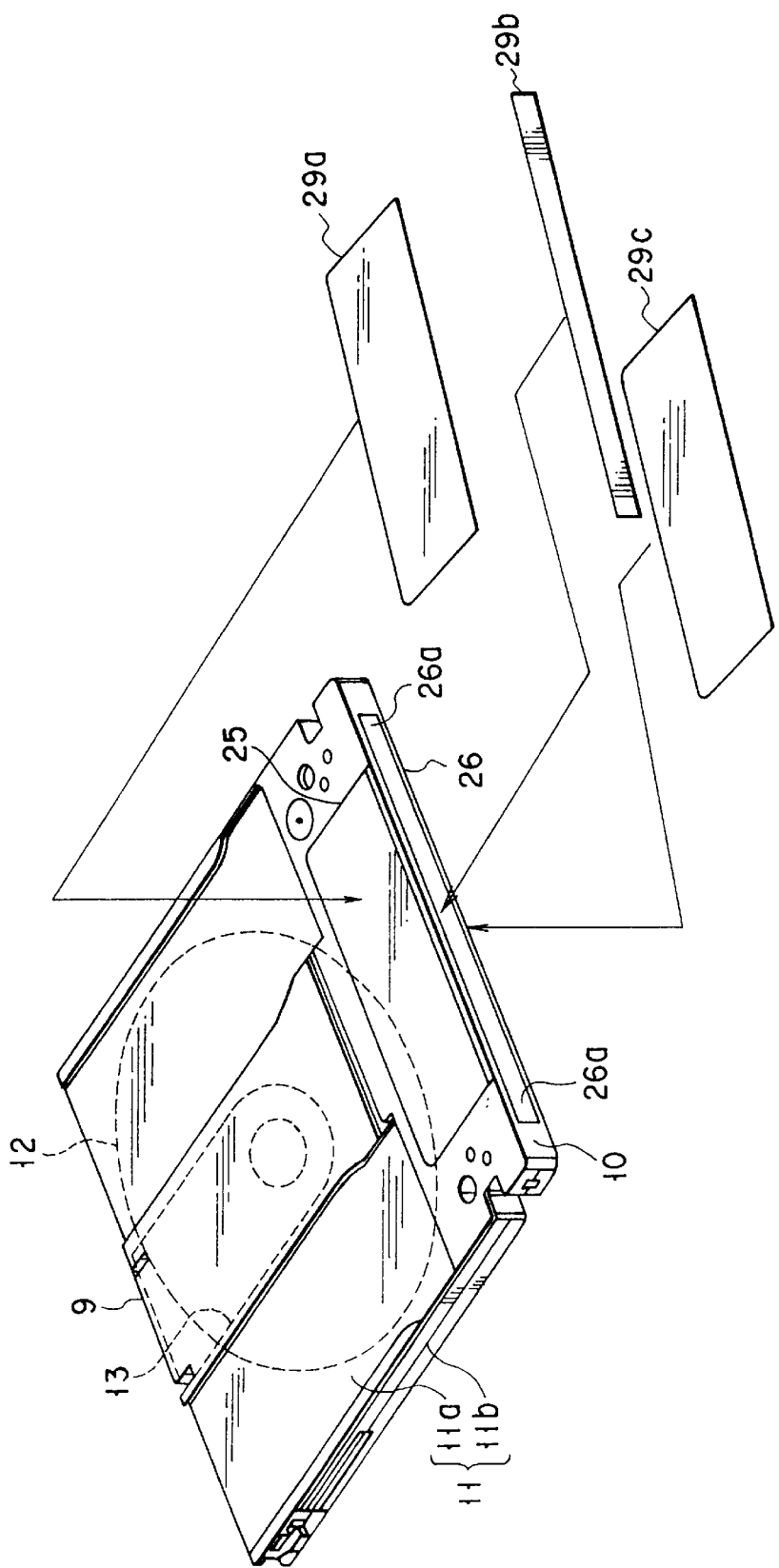
FIG. 19 is a perspective view showing the disc cartridge and another indication label applied thereto.

Otherwise, as shown in FIG. 19, indication labels 29a to 29c each having one single indication surface may be independently adhered on the first and second label adhering portions 25 and 26 of the cartridge. Then, the adhering area of the second label adhering portion 26 of the lid member 10 in the rear end side of the cartridge body 11 can particularly be enlarged, so that the indication contents can achieve a high degree of freedom. In this case, the indication labels 29a to 29c are independently adhered on the base sheet, as shown in FIG. 18D.

When the disc cartridge constructed as described above is loaded into a disc recording/reproducing device not shown along the insert direction E shown in FIG. 1, the shutter 9 is slid toward an end side (to the left or right) at first by the shutter opening/closing means in the device, and the opening portion 13 is thereby opened. Then, a turn table not shown enters through the opening portion 13 into the cartridge body 11 to rotatably support the optical disc 12 while a pick-up faces one surface of the optical disc 12 through the opening portion 13.

In this state, the optical disc 12 is rotated by the turn-table, and information signals are recorded on and/or reproduced from the optical disc 12 by the pick-up. To record information into the optical disc 12, the first or second write protect operating portion 19 or 20 must be previously set to the write allowable position.

To extract the optical disc 12 from the cartridge body 11, the lock claw 16 of the lid member 10 is pushed against the elasticity of itself, so as to leave the engage hole 17, and the lid member is rotated in the arrow direction D. Then, the disc 12 stored in the disc storing portion 15 of the cartridge body 11 is guided along the disc guide groove portion 18 of the lid member 10, passing through the disc inlet/outlet port 14, so that extraction of the disc is enabled. In this state, the lid member 10 bends and removes away the open/close detect pin 23 provided in the lower casing 11b of the cartridge body 11, in association with its rotation, thereby indicating that the lid member 10 has been opened so that the disc can be extracted.

This lid member 10 closes the disc inlet/outlet port 14 when the lid member 10 is rotated in the arrow direction C from its open position. In this case, if the free end portion of the lid member 10 is pushed until it eliminates the clearance M and abuts against the rear end surface lid of the cartridge body 11, the lock claw 16 is elastically engaged with the engage hole 17, and the lid member 10 securely closes the disc inlet/outlet port 14, while being kept in contact with the rear end surface of the cartridge body 11 by the elastic force of the lid member itself.

According to the disc cartridge constructed as described above, the disc inlet/outlet port 14 is formed such that the portion through which the outer peripheral portion of the disc passes is narrower than the portion through which the center portion of the disc passes, and the disc storing portion 15 of this cartridge body 11 is formed such that the first region of the storing portion 15 extending from the disc inlet/outlet port 14 to the substantial center portion of the disc storing portion has a cross section substantially equal to that of the disc inlet/outlet port 14 while the second region of the storing portion 15 extending from the substantial center portion to the opposite end of the cartridge body becomes gradually narrower in the radial direction from the disc center portion toward the outer periphery.

Therefore, only the outer peripheral portion of the optical disc 12 is brought into contact with the disc storing portion 15 thereby preventing the recording surfaces of the disc from being damaged, when the optical disc 12 contained in the cartridge body 11 behaves in an unstable manner. In addition, when the optical disc 12 is extracted from the disc inlet/outlet port 14 of the cartridge body 11, only the outer peripheral portion of the optical disc is guided by the disc storing portion 15 and the disc inlet/outlet port 14, so that the data recording surfaces of the optical disc 12 is protected from damages.

Therefore, the optical disc 12 can be safely taken in and out from the cartridge body 11 while ensuring the disc cartridge structure that the optical disc 12 is contained in the cartridge body 11. Thus, the degree of freedom in use of the disc is increased.

Note that the present invention is not limited to the above-mentioned embodiments, but can be variously modified within the scope of the present invention.

For example, the above explanation has been made to an embodiment applied to the optical disc 12 having data recording surfaces on both sides. However, the present invention is not limited thereto but can be applied to a disc which has a data recording surface on only one side. In this case, as in the above-mentioned embodiment, the rib structure or the surface structure may be used, and at least that region of the disc storing portion which faces the data recording surface of the disc may be formed so that the clearance between the inner surface of the cartridge body and the data recording surface is gradually reduced from the disc center portion to the outer periphery.

The recording medium contained in the cartridge body is not limited to an optical disc, but any other kind of disc-like recording medium such as a magnetic disc, a magneto-optical disc, or the like is applicable.

In addition, in the structure according to the above embodiment, the lid member 10 is arranged to be rotatable with respect to the disc inlet/outlet port 14 of the cartridge body 11. The present invention is not limited hereto, but other various open/close structures are applicable.

What is claimed is:

1. A disc cartridge comprising:
    a cartridge body configured to define a disc storing portion having a width suitable for rotatably storing a disc-like recording medium, an opening for exposing a part of a surface of the recording medium, and a disc inlet/outlet port communicating with the disc storing portion and having a width suitable for insertion of the recording medium into the disc cartridge and removal of the recording medium from the disc cartridge;
    a shutter slidably mounted on the cartridge body for opening and closing the opening; and
    a lid mounted on the cartridge body and movable between a closed position wherein the lid closes the disc inlet/outlet port and an opened position wherein the lid opens the disc inlet/outlet port;
    wherein the disc inlet/outlet port has a central portion through which a center of the recording medium passes during insertion and removal of the recording medium and end portions through which peripheral edges of the recording medium pass during insertion and removal of the recording medium, the disc inlet/outlet port is configured such that the width of the disc inlet/outlet port gradually decreases from the central portion to the end portions in a tapered manner, and the width of the disc inlet/outlet port at the end portions is slightly larger than a thickness of the recording medium such that lateral movement of the recording medium in a width-wise direction of the disc inlet/outlet port is substantially restricted as the recording medium is being inserted into or removed from the disc cartridge through the disc inlet/outlet port, the disc storing portion comprises a central region which faces the center of the recording medium when the recording medium is rotatably stored in the disc storing portion, a first region having a middle region through which the center of the recording medium passes during insertion and removal of the recording medium and end regions through which the peripheral edges of the recording medium pass during insertion and removal of the recording medium and extending from the central region to the disc inlet/outlet port, and a second region having an edge region in which the peripheral edges of the recording medium are disposed when the recording medium is rotatably stored in the disc storing portion and extending from the central region in a direction away from the disc inlet/outlet port, the first region has a cross-section such that the width of the disc storing portion in the first region gradually decreases from the middle region to the end regions in a tapered manner, the width of the disc storing portion in the second region gradually decreases in a radial direction from the central region to the edge region in a tapered manner, the width of the disc storing portion in the end regions is slightly larger than the thickness of the recording medium such that lateral movement of the recording medium in a widthwise direction of the disc storing portion is substantially restricted as the recording medium is being inserted into and removed from the disc cartridge through the disc inlet/outlet port, the width of the disc storing portion in the edge region is slightly larger than the thickness of the recording medium such that lateral movement of the recording medium in the widthwise direction of the disc storing portion is substantially restricted when the recording medium is rotatably stored in the disc storing portion with the peripheral edges thereof stored in the edge region, and the disc storing portion is constructed and arranged such that the recording medium can be inserted into the disc storing portion through the disc input/output port and rotatably stored in the disc storing portion with the peripheral edges of the recording medium disposed in the edge region of the second region.

2. A disc cartridge according to claim 1, wherein the cartridge body further comprises an inner surface facing a surface of the recording medium and a plurality of ribs provided on the inner surface, the plurality of ribs defining the disc storing portion.

3. A disc cartridge according to claim 1, wherein the lid is a different color than the cartridge body.

4. A disc cartridge according to claim 1, wherein the lid is rotatably mounted on the cartridge body and rotatable between the closed position and the opened position.

5. A disc cartridge comprising:

a flat rectangular box-like cartridge body configured to define a disc storing portion having a width suitable for rotatably storing a disc-like recording medium, upper and lower rectangular main walls which are parallel to each other and respectively face upper and lower surfaces of the recording medium, a plurality of side walls continuous to the main walls, openings on the main walls extending from center portions of the main walls to the vicinity of one of the side walls for exposing parts of the surfaces of the recording medium, and a disc inlet/outlet port communicating with the disc storing portion formed in a side wall opposite said one of the side walls and having a width suitable for insertion of the recording medium into the disc cartridge and removal of the recording medium from the disc cartridge;

a shutter slidably mounted on the cartridge body, for opening and closing the openings; and a lid mounted on the cartridge body and movable between a closed position wherein the lid closes the disc inlet/outlet port and an opened position wherein the lid opens the disc inlet/outlet port;

wherein the disc inlet/outlet port includes a central portion through which a center of the recording medium passes during insertion and removal of the recording medium and end portions through which peripheral edges of the recording medium pass during insertion and removal of the recording medium, the disc inlet/outlet port is configured such that the width of the disc inlet/outlet port gradually decreases from the central portion to the end portions in a tapered manner, and the width of the disc inlet/outlet port at the end portions is slightly larger than a thickness of the recording medium such that lateral movement of the recording medium in a widthwise direction of the disc inlet/outlet port is substantially restricted as the recording medium is being inserted into or removed from the disc cartridge through the disc inlet/outlet port, the disc storing portion comprises a central region which faces the center of the recording medium when the recording medium is rotatably stored in the disc storing portion, a first region having a middle region through which the center of the recording medium passes during insertion and removal of the recording medium and end regions through which the peripheral edges of the recording medium pass during insertion and removal of the recording medium and extending from the central region to the disc inlet/outlet port, and a second region having an edge region in which the peripheral edges of the recording medium are disposed when the recording medium is rotatably stored in the disc storing portion and extending from the central region in a direction away from the disc inlet/outlet port, the first region has a cross-section such that the width of the disc storing portion in the first region gradually decreases from the middle region to the end regions in a tapered manner, the width of the disc storing portion in the second region gradually decreases in a radial direction from the central region to the edge region in a tapered manner, the width of the disc storing portion in the end regions is slightly larger than the thickness of the recording medium such that lateral movement of the recording medium in a widthwise direction of the disc storing portion is substantially restricted as the recording medium is inserted into and removed from the disc cartridge through the disc inlet/outlet port, the width of the disc storing portion in the edge region is slightly larger than the thickness of the recording medium such that lateral movement of the recording medium in the widthwise direction of the disc storing portion is substantially restricted when the recording medium is rotatably stored in the disc storing portion with the peripheral edges thereof stored in the edge region, and the disc storing portion is constructed and arranged such that the recording medium can be inserted into the disc storing portion through the disc input/output port and rotatably stored in the disc storing portion with the peripheral edges of the recording medium disposed into the edge region of the second region.

6. A disc cartridge according to claim 5, wherein the upper main wall has an inner surface facing the upper surface of the recording medium and the lower main wall has an inner surface facing the lower surface of the recording medium, and each of the main walls has a plurality of ribs projecting from the inner surfaces and defining the disc storing portion.

7. A disc cartridge according to claim 6, wherein the plurality of ribs includes a plurality of first ribs disposed in the first region and a plurality of second ribs disposed in the second region, and each of the second ribs extends in the radial direction from the central region of the disc storing portion to the edge region of the second region and a height of each second rib gradually increases from the central region of the disc storing portion to the edge region, thereby gradually decreasing the width of the disc storing position in the radial direction from the central region to the edge region in a tapered manner.

8. A disc cartridge according to claim 6, wherein the plurality of ribs includes a semi-circular rib disposed in the edge region of the second region and having a radius slightly larger than a radius of the recording medium.

9. A disc cartridge comprising:

a flat rectangular box-like cartridge body configured to define a disc storing portion having a width suitable for rotatably storing a disc-like recording medium, upper and lower rectangular main walls which are parallel to each other and respectively face upper and lower surfaces of the recording medium when rotatably stored in the disc cartridge, a plurality of side walls continuous to the main walls, openings on the main walls extending from center portions of the main walls to the vicinity of one of the side walls for exposing parts of the surfaces of the recording medium, and a disc inlet/outlet port communicating with the disc storing portion formed in a side wall opposite said one of the side walls and having a width suitable for insertion of the recording medium into the disc cartridge and removal of the recording medium from the disc cartridge, each of the main walls having a plurality of ribs projecting from inner surfaces thereof such that the ribs of the upper main wall are spaced apart in a widthwise direction of the disc storing portion from the ribs of the lower main wall to thereby define the disc storing portion;

a shutter slidably mounted on the cartridge body, for opening and closing the openings; and a lid mounted on the cartridge body and movable between a closed position wherein the lid closes the disc inlet/outlet port and an opened position wherein the lid opens the disc inlet/outlet port;

wherein the disc inlet/outlet port includes a central portion through which a center of the recording medium passes during insertion and removal of the recording medium and end portions through which peripheral edges of the recording medium pass during insertion and removal of the recording medium, the disc inlet/outlet port is configured such that the width of the disc inlet/outlet port gradually decreases from the central portion to the end portions in a tapered manner, and the width of the disc inlet/outlet port at the end portions is slightly larger than a thickness of the recording medium such that lateral movement of the recording medium in a widthwise direction of the disc inlet/outlet port is substantially restricted as the recording medium is being inserted into or removed from the disc cartridge through the disc inlet/outlet port, the disc storing portion comprises a central region which faces the center of the recording medium when the recording medium is rotatably stored in the disc storing portion, a first region having a middle region through which the center of the recording medium passes during insertion and removal of the recording medium and end regions through which the peripheral edges of the recording medium pass during insertion and removal of the recording medium and extending from the central region to the disc inlet/outlet port, and a second region having an edge region in which the peripheral edges of the recording medium are disposed when the recording medium is rotatably stored in the disc storing portion and extending from the central region in a direction away from the disc inlet/outlet port, the first region has a cross-section such that the width of the disc storing portion in the first region gradually decreases from the middle region to the end regions in a tapered manner, the width of the disc storing portion in the second region gradually decreases in a radial direction from the central region to the edge region in a tapered manner, the width of the disc storing portion in the end regions is slightly larger than the thickness of the recording medium such that lateral movement of the recording medium in the widthwise direction of the disc storing portion is substantially restricted as the recording medium is being inserted into or removed from the disc cartridge through the disc inlet/outlet port, the width of the disc storing portion in the edge region is slightly larger than the thickness of the recording medium such that lateral movement of the recording medium in the widthwise direction of the disc storing portion is substantially restricted when the recording medium is rotatably stored in the disc storing portion with the peripheral edges thereof in the edge region, and the disc storing portion is constructed and arranged such that the recording medium can be inserted into the disc storing portion through the disc input/output port and rotatably stored in the disc storing portion with the peripheral edges of the recording medium disposed into the edge region of the second region.

* * * * *